(12) United States Patent
Mirth et al.

(10) Patent No.: US 12,003,594 B2
(45) Date of Patent: Jun. 4, 2024

(54) SYSTEMS AND METHODS FOR NETWORK DISCOVERY IN A MULTI-LAYER OPERATIONAL TECHNOLOGY NETWORK

(71) Applicant: Rockwell Automation Technologies, Inc., Mayfield Heights, OH (US)

(72) Inventors: Timothy C. Mirth, Hudson, OH (US); Taryl J. Jasper, Concord Township, OH (US); Terence S. Tenorio, Solon, OH (US); Thaddeus A. Palus, Denver, CO (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 41 days.

(21) Appl. No.: 17/867,931

(22) Filed: Jul. 19, 2022

(65) Prior Publication Data

US 2024/0031445 A1    Jan. 25, 2024

(51) Int. Cl.
*H04L 67/51* (2022.01)
*H04L 67/1061* (2022.01)
*H04W 48/16* (2009.01)

(52) U.S. Cl.
CPC .......... *H04L 67/51* (2022.05); *H04L 67/1061* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 10,320,619 B2 | 6/2019 | Seddigh et al. | |
| 11,032,124 B1 | 6/2021 | Haddow et al. | |
| 2010/0208662 A1* | 8/2010 | Fuste Vilella | H04L 45/02 370/328 |
| 2016/0127207 A1* | 5/2016 | Zaccaria | G05B 19/0428 709/224 |
| 2018/0024537 A1* | 1/2018 | Chauvet | H04L 63/20 718/104 |
| 2020/0012265 A1* | 1/2020 | Thomsen | G06F 3/0481 |

(Continued)

FOREIGN PATENT DOCUMENTS

CA    3144110 A1    1/2021

OTHER PUBLICATIONS

Extended European Search Report for Application No. 23181182.9 mailed Dec. 7, 2023, 9 pages.

*Primary Examiner* — Schquita D Goodwin
*Assistant Examiner* — Jonathan A Sparks
(74) *Attorney, Agent, or Firm* — Fletcher Yoder, P.C.

(57) ABSTRACT

Performing multi-layer network discovery of an operational technology (OT) network includes receiving a plurality of discovery data sets, each identifying a respective subset of a plurality of nodes within an OT network having a plurality of network layers, wherein the respective subset of the plurality of nodes for a first discovery data set are disposed within at least two network layers of the plurality of network layers, identifying a set of nodes within the OT network that appear in two or more of the plurality of discovery data sets, generating a holistic discovery data set for the OT network based on the plurality of discovery data sets and the identified set of nodes within the OT network that appear in the two or more of the plurality of discovery data sets, and generating a visualization of the plurality of nodes within the OT network based on the holistic discovery data set.

20 Claims, 10 Drawing Sheets

(56) References Cited

U.S. PATENT DOCUMENTS

| | | | |
|---|---|---|---|
| 2020/0162924 A1* | 5/2020 | Desai | H04W 12/108 |
| 2020/0412767 A1 | 12/2020 | Crabtree et al. | |
| 2021/0409439 A1* | 12/2021 | Engelberg | H04L 63/145 |
| 2023/0156030 A1* | 5/2023 | Bassi | H04L 63/1425 |
| | | | 726/25 |

* cited by examiner

SYSTEMS AND METHODS FOR NETWORK DISCOVERY IN A MULTI-LAYER OPERATIONAL TECHNOLOGY NETWORK

BACKGROUND

The present disclosure generally relates to network discovery in an operational technology (OT) network. More specifically, the present disclosure relates to discovering components in a multi-layer OT network that includes industrial automation devices.

Industrial automation systems may be used to provide automated control of one or more components (e.g., actuators, sensors, power supplies, etc.) in an industrial setting. OT networks may be used to communicatively couple industrial automation systems and/or industrial automation components within an industrial automation system. The OT network may include multiple nodes distributed across multiple network layers. Given the broad spectrum of devices that may be installed on an OT network, and that communication between devices on an OT network may be limited, performing network discovery in a multi-layer OT network in a way that discovers all of the devices and/or nodes on the OT network can be challenging. Accordingly, it may be desirable to develop improved techniques for performing network discovery in a multi-layer OT network.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment a system includes a memory and a processor. The memory is accessible by the processor and stores instructions that, when executed by the processor, cause the processor to transmit a plurality of discovery probes from a plurality of respective entry points into an operational technology (OT) network, wherein the OT network comprises a plurality of industrial automation components configured to perform an industrial automation operation, and wherein the OT network comprises a plurality of network layers, receive a plurality of discovery data sets in response to the plurality of discovery probes, wherein each of the plurality of discovery data sets comprises data identifying a respective subset of a plurality of nodes within the OT network, wherein the respective subset of the plurality of nodes for a first discovery data set are disposed within at least two network layers of the plurality of network layers, identify a set of nodes within the OT network that appear in two or more of the plurality of discovery data sets, generate a holistic discovery data set for the OT network based on the plurality of discovery data sets and the identified set of nodes within the OT network that appear in the two or more of the plurality of discovery data sets, and generate a visualization of the plurality of nodes within the OT network based on the holistic discovery data set.

In another embodiment, performing multi-layer network discovery of an operational technology (OT) network includes receiving a plurality of discovery data sets, each identifying a respective subset of a plurality of nodes within an OT network having a plurality of network layers, wherein the respective subset of the plurality of nodes for a first discovery data set are disposed within at least two network layers of the plurality of network layers, identifying a set of nodes within the OT network that appear in two or more of the plurality of discovery data sets, generating a holistic discovery data set for the OT network based on the plurality of discovery data sets and the identified set of nodes within the OT network that appear in the two or more of the plurality of discovery data sets, and generating a visualization of the plurality of nodes within the OT network based on the holistic discovery data set.

In another embodiment, non-transitory computer readable medium storing instructions that, when executed by a processor, cause the processor to transmit a first plurality of discovery probes from a first plurality of respective entry points into an operational technology (OT) network, wherein the OT network comprises a plurality of industrial automation components configured to perform an industrial automation operation, and wherein the OT network comprises a plurality of network layers, receive a first plurality of discovery data sets in response to the first plurality of discovery probes, wherein each of the first plurality of discovery data sets comprises data identifying a first respective subset of a plurality of nodes within the OT network, wherein the first respective subset of the plurality of nodes for a first discovery data set are disposed within at least two network layers of the plurality of network layers, identify a first set of nodes within the OT network that appear in two or more of the first plurality of discovery data sets, in response to determining the first set of nodes fails to meet a specified condition (e.g., that a first number of nodes in is less than a threshold value, new inter-node linkages have been identified that warrant additional discovery, a set time interval has elapsed, etc.), transmit a second plurality of discovery probes from a second plurality of respective entry points into the OT network, receive a second plurality of discovery data sets in response to the second plurality of discovery probes, wherein each of the second plurality of discovery data sets comprises data identifying a second respective subset of the plurality of nodes within the OT network, identify a second set of nodes within the OT network that appear in two or more of the first and second plurality of discovery data sets, and in response to determining that in the first set of nodes and the second set of nodes meet the specified condition (e.g., the number of nodes in the first set of nodes and the second set of nodes is greater than the threshold value, no new inter-node linkages have been identified that warrant additional discovery, the set time interval has not elapsed), generate a holistic discovery data set for the OT network based on the first plurality of discovery data sets, the second plurality of discovery data sets, and the identified second set of nodes within the OT network that appear in the two or more of the first and second plurality of discovery data.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present embodiments will become better understood when the following detailed description is read with reference to the accompanying drawings in which like characters represent like parts throughout the drawings, wherein.

Figure 6:
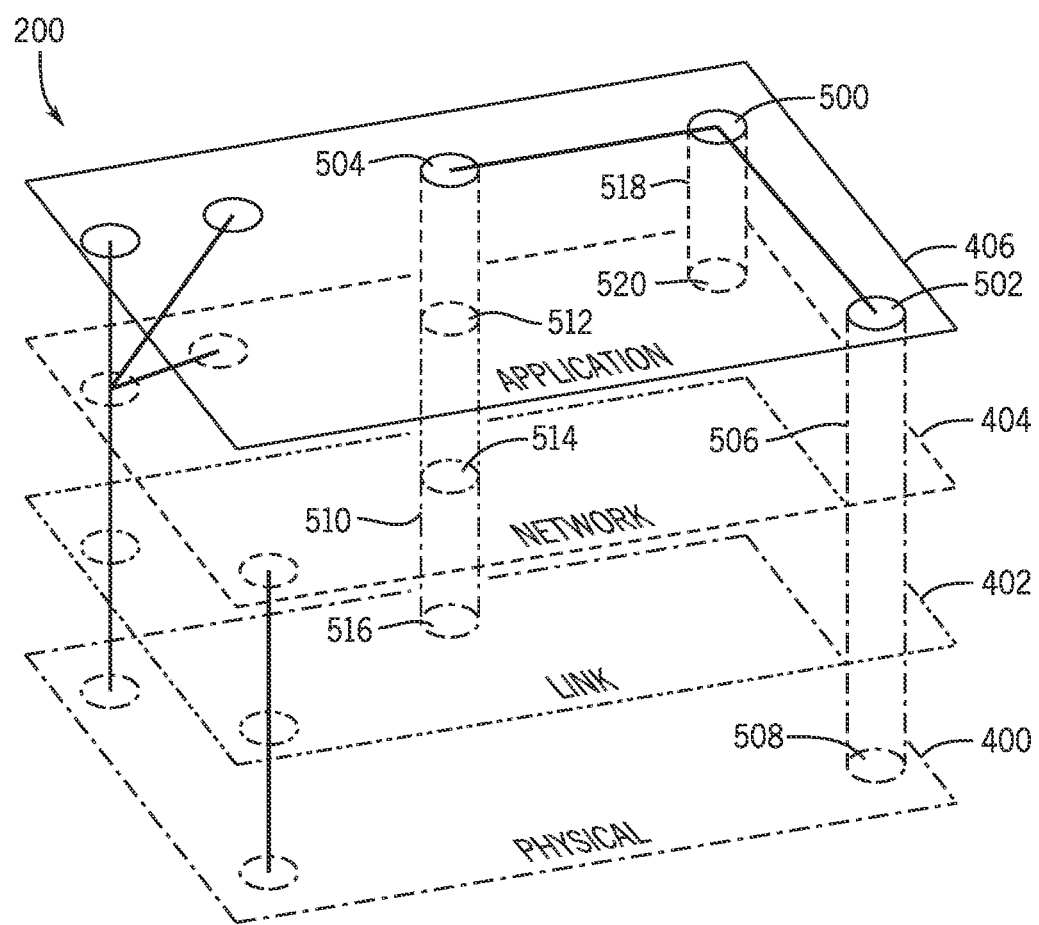
FIG. 6 illustrates a schematic depicting a first iteration of network discovery of a multi-layer OT network using a first node as a first entry point, in accordance with aspects of the present disclosure.
Figure 7:
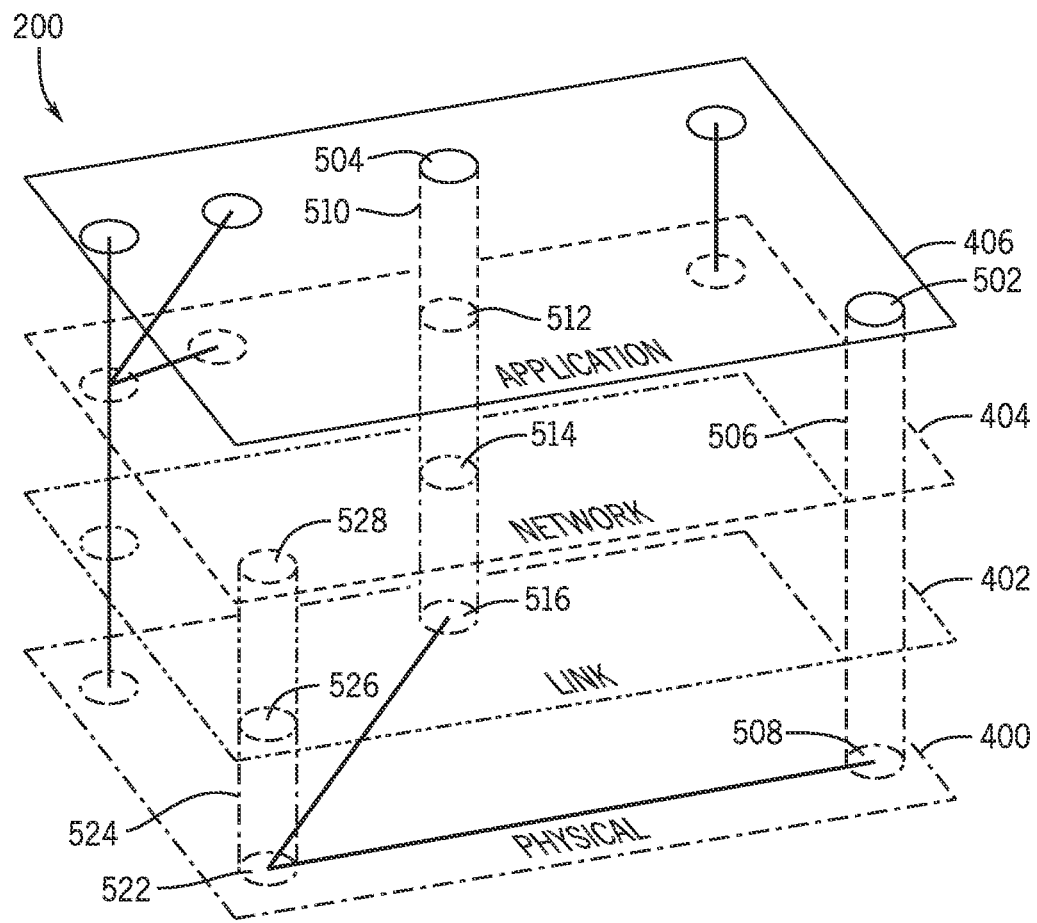
FIG. 7 illustrates a schematic depicting a second iteration of network discovery of the multi-layer OT network of FIG. 6 using a second node as a second entry point, in accordance with aspects of the present disclosure.
Figure 8:
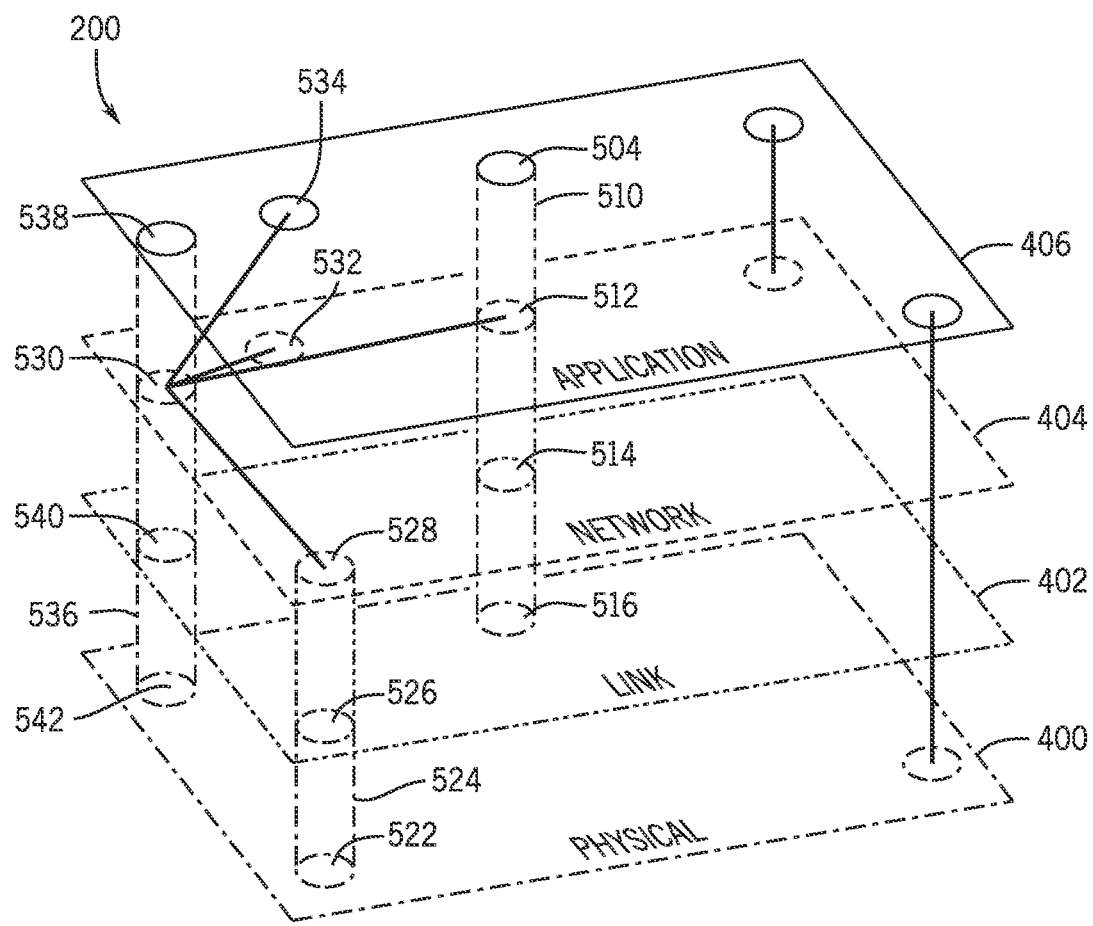
FIG. 8 illustrates a schematic depicting a third iteration of network discovery of the multi-layer OT network of FIGS. 6 and 7 using a third node as a third entry point, in accordance with aspects of the present disclosure.
Figure 9:
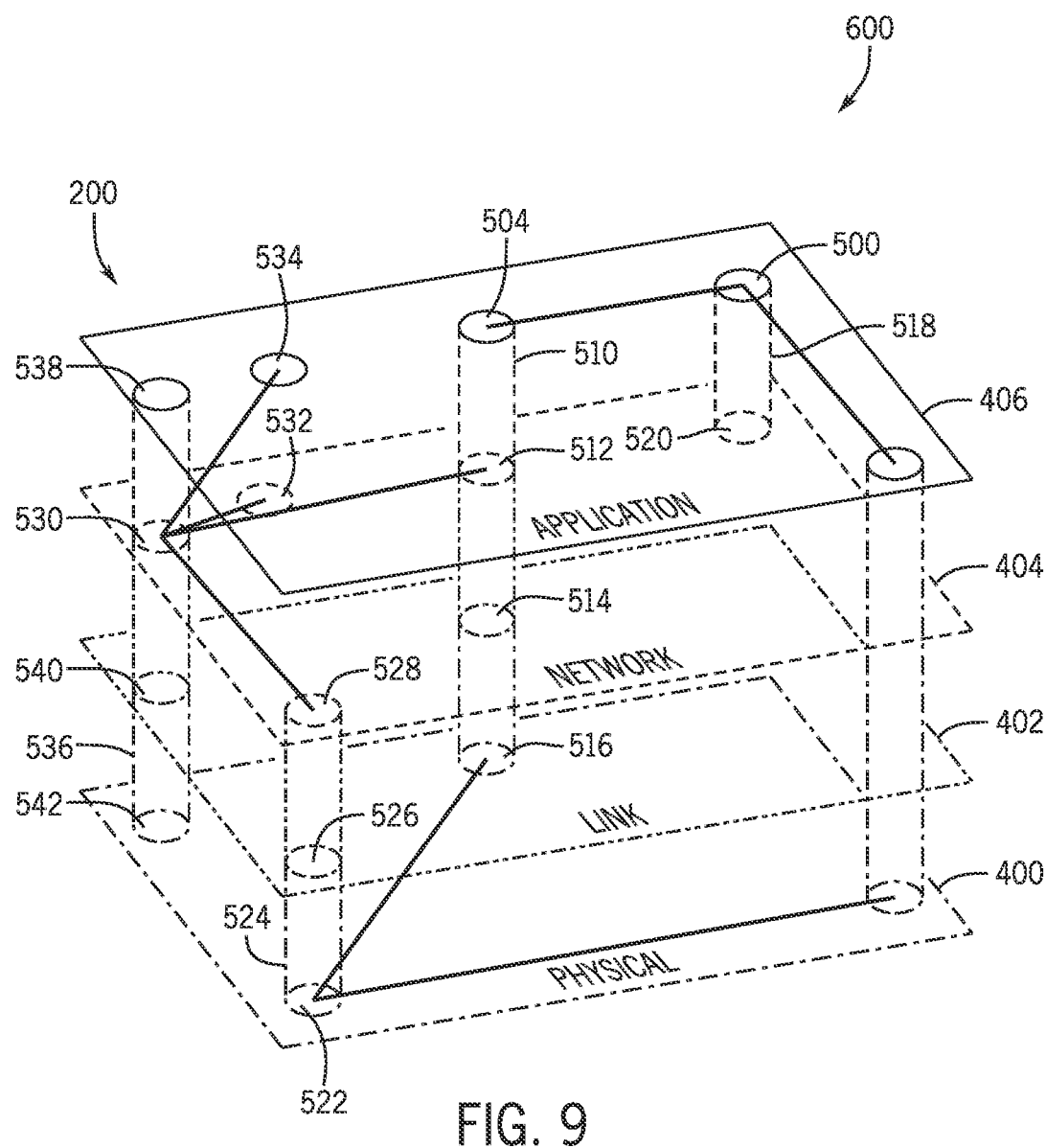
Figure 10:
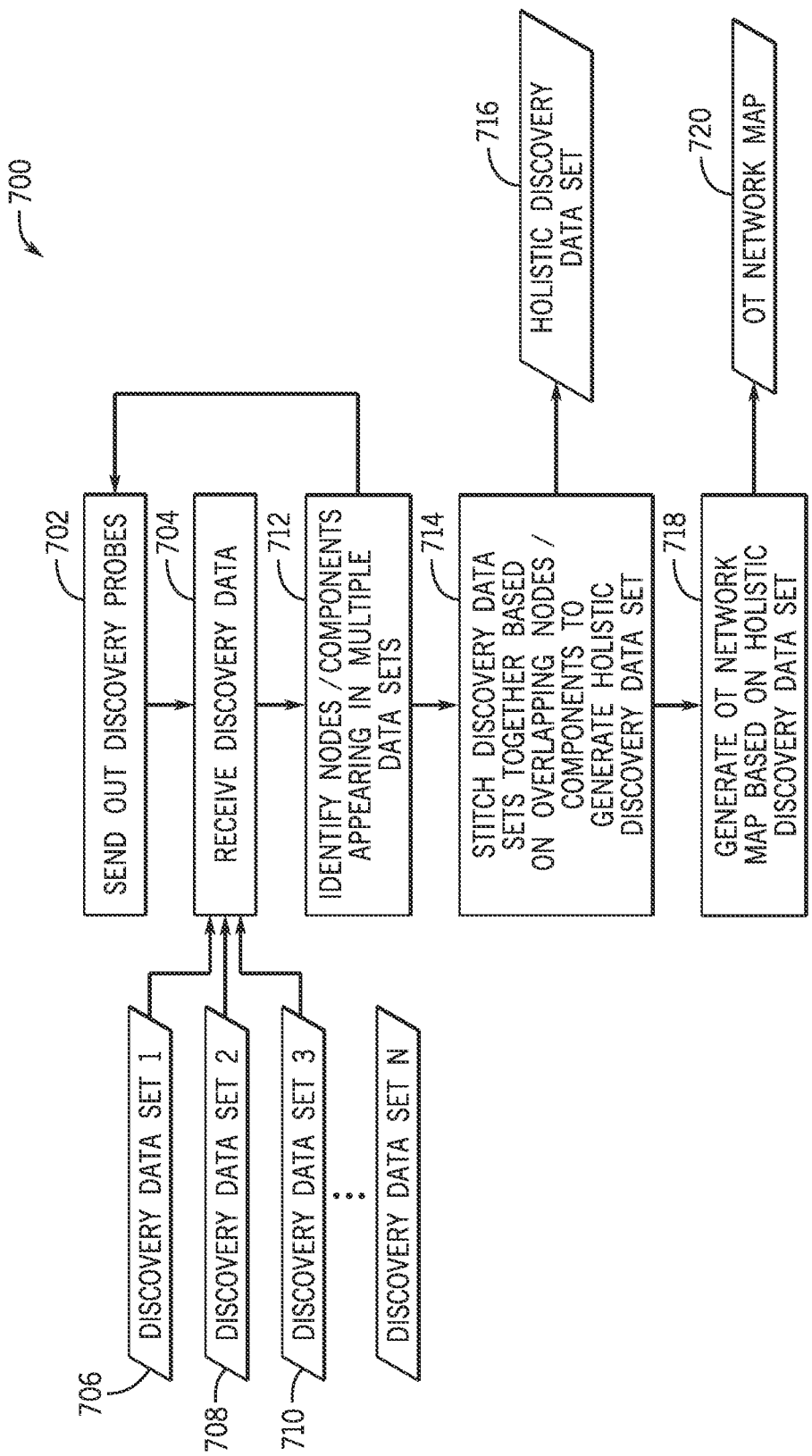

FIG. 9 illustrates a map of the multi-layer OT network of FIGS. 6-8 based on stitching together the first, second, and third sets of discovery data described with regard to FIGS. 6-8, in accordance with aspects of the present disclosure; and FIG. 10 illustrates a flow chart of a process for performing network discovery in the multi-layer OT network of FIGS. 6-8, in accordance with aspects of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure includes techniques for asset discovery and management for an OT network having multiple layers. The present asset discovery and management techniques use discovery agents installed throughout the OT network to probe the OT network and identify hardware and software assets that are connected to, or otherwise visible from, the assets on which the discovery agent is running. Accordingly, the various discovery agents may return data indicative of their respective views of the OT network, each including multiple nodes (e.g., edge devices, end devices, controllers, computing devices, applications, etc.) that may span multiple layers of the OT network. The data from the various discovery agents may be combined with other discovery data (e.g., captured network traffic, CIP discovery, LLDP, FTNM, FTLinx, OPC-UA, WMI Probe data, network traffic data, and/or third party data). A topology service may receive the data from the various discovery agents, which constitute various perspective views of the OT network, as well as any other discovery data, and stitch the various views together to create a single holistic graph of the OT network. This may include, for example, using characteristic information (e.g., IP addresses, MAC addresses, serial numbers, etc.) to identify and/or characterize assets that appear in multiple sets of data and then stitching those sets of data together and consolidating the data, until a graph of the whole OT network is generated. Legacy devices that may lack discovery capabilities may be identified by other assets on the network and/or based on noise in their communication. In some cases, devices may be filtered, sorted, and or/or grouped based upon their respective functionalities. Once the topology service has developed a model of the OT network, a graphical user interface (GUI) may be presented to the customer which may include, for example, an visualization of the OT network that may or may not be interactive (e.g., zoom in, zoom out, filter assets, select assets, etc.). Further, the GUI may include a list of assets that may be sorted, filtered, searched, etc. as the user desires.

In some cases, once collected, the discovery data may be used to perform various other functions. For example, discovery data may be used to verify the identities of counterfeit or compromised assets on the OT network and generate notifications. Similarly, the discovery data may be used to identify that an asset is running an outdated version of firmware or software and generate a notification that a new software/firmware version is available and recommend an update. Along these lines, discovery data may be used to identify when an asset is subject to a known security vulnerability, subject to a recall, or otherwise in need of attention and generate a notification to that effect. In some cases, if an asset fails or experiences a problem, the discovery data and/or other forensic data may be provided to an entity (e.g., network admin, IT department, security team, manufacturer, OEM, distributor, etc.) for analysis. Additional details with regard to managing software asset licensing and usage in accordance with the techniques described above will be provided below with reference to FIGS. 1-10.

Figure 1:
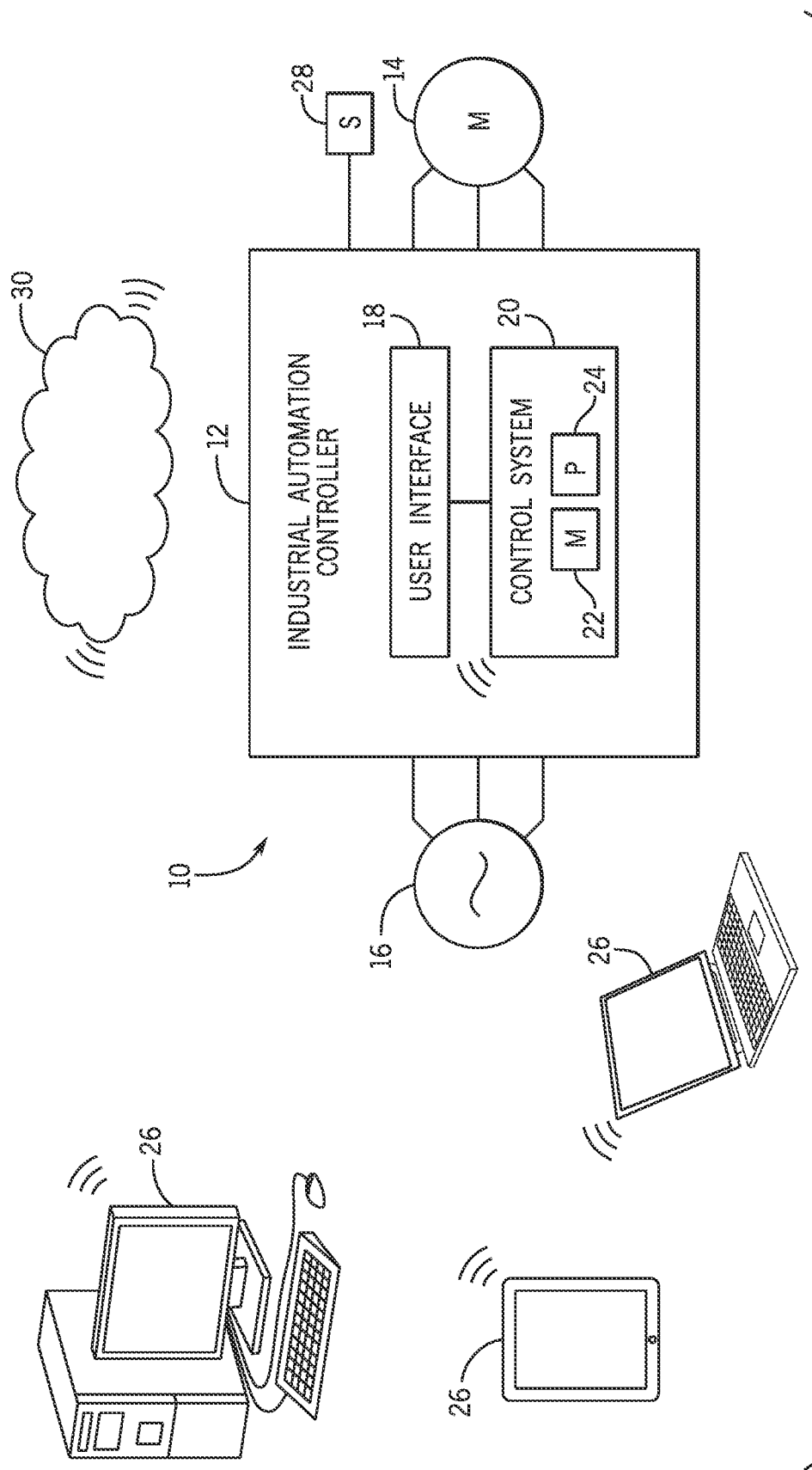
FIG. 1 illustrates a schematic view of an industrial automation system, in accordance with embodiments presented herein.

By way of introduction, FIG. 1 is a schematic view of an example industrial automation system 10 in which the embodiments described herein may be implemented. As shown, the industrial automation system 10 includes a controller 12 and an actuator 14 (e.g., a motor). The industrial automation system 10 may also include, or be coupled to, a power source 16. The power source 16 may include a generator, an external power grid, a battery, or some other source of power. The controller 12 may be a stand-alone control unit that controls multiple industrial automation components (e.g., a plurality of motors 14), a controller 12 that controls the operation of a single automation component (e.g., motor 14), or a subcomponent within a larger industrial automation system 10. In the instant embodiment, the controller 12 includes a user interface 18, such as a human machine interface (HMI), and a control system 20, which may include a memory 22 and a processor 24. The controller 12 may include a cabinet or some other enclosure for housing various components of the industrial automation system 10, such as a motor starter, a disconnect switch, etc.

The control system 20 may be programmed (e.g., via computer readable code or instructions stored on the memory 22 and executable by the processor 24) to provide signals for controlling the motor 14. In certain embodiments, the control system 20 may be programmed according to a specific configuration desired for a particular application. For example, the control system 20 may be programmed to respond to external inputs, such as reference signals, alarms, command/status signals, etc. The external inputs may originate from one or more relays or other electronic devices. The programming of the control system 20 may be accomplished through software or firmware code that may be loaded onto the internal memory 22 of the control system 20 (e.g., via a locally or remotely located computing device 26) or programmed via the user interface 18 of the controller 12. The control system 20 may respond to a set of operating parameters. The settings of the various operating parameters may determine the operating characteristics of the controller 12. For example, various operating parameters may determine the speed or torque of the motor 14 or may determine how the controller 12 responds to the various external inputs. As such, the operating parameters may be used to map control variables within the controller 12 or to control other devices communicatively coupled to the controller 12. These variables may include, for example, speed presets, feedback types and values, computational gains and variables, algorithm adjustments, status and feedback variables, programmable logic controller (PLC) control programming, and the like.

In some embodiments, the controller 12 may be communicatively coupled to one or more sensors 28 for detecting operating temperatures, voltages, currents, pressures, flow rates, and other measurable variables associated with the industrial automation system 10. With feedback data from the sensors 28, the control system 20 may keep detailed track of the various conditions under which the industrial automation system 10 may be operating. For example, the feedback data may include conditions such as actual motor speed, voltage, frequency, power quality, alarm conditions, etc. In some embodiments, the feedback data may be communicated back to the computing device 26 for additional analysis.

The computing device 26 may be communicatively coupled to the controller 12 via a wired or wireless connection. The computing device 26 may receive inputs from a user defining an industrial automation project using a native application running on the computing device 26 or using a web site accessible via a browser application, a software application, or the like. The user may define the industrial automation project by writing code, interacting with a visual programming interface, inputting or selecting values via a graphical user interface, or providing some other inputs. The user may use licensed software and/or subscription services to create, analyze, and otherwise develop the project. The computing device 26 may send a project to the controller 12 for execution. Execution of the industrial automation project causes the controller 12 to control components (e.g., motor 14) within the industrial automation system 10 through performance of one or more tasks and/or processes. In some applications, the controller 12 may be communicatively positioned in a private network and/or behind a firewall, such that the controller 12 does not have communication access outside a local network and is not in communication with any devices outside the firewall, other than the computing device 26. As previously discussed, the controller 12 may collect feedback data during execution of the project, and the feedback data may be provided back to the computing device 26 for analysis. Feedback data may include, for example, one or more execution times, one or more alerts, one or more error messages, one or more alarm conditions, one or more temperatures, one or more pressures, one or more flow rates, one or more motor speeds, one or more voltages, one or more frequencies, and so forth. The project may be updated via the computing device 26 based on the analysis of the feedback data.

The computing device 26 may be communicatively coupled to a cloud server 30 or remote server via the internet, or some other network. In one embodiment, the cloud server 30 may be operated by the manufacturer of the controller 12, a software provider, a seller of the controller 12, a service provider, operator of the controller 12, owner of the controller 12, etc. The cloud server 30 may be used to help customers create and/or modify projects, to help troubleshoot any problems that may arise with the controller 12, or to provide other services (e.g., project analysis, enabling, restricting capabilities of the controller 12, data analysis, controller firmware updates, etc.). The remote/cloud server 30 may be one or more servers operated by the manufacturer, software provider, seller, service provider, operator, or owner of the controller 12. The remote/cloud server 30 may be disposed at a facility owned and/or operated by the manufacturer, software provider, seller, service provider, operator, or owner of the controller 12. In other embodiments, the remote/cloud server 30 may be disposed in a datacenter in which the manufacturer, software provider, seller, service provider, operator, or owner of the controller 12 owns or rents server space. In further embodiments, the remote/cloud server 30 may include multiple servers operating in one or more data center to provide a cloud computing environment.

Figure 2:
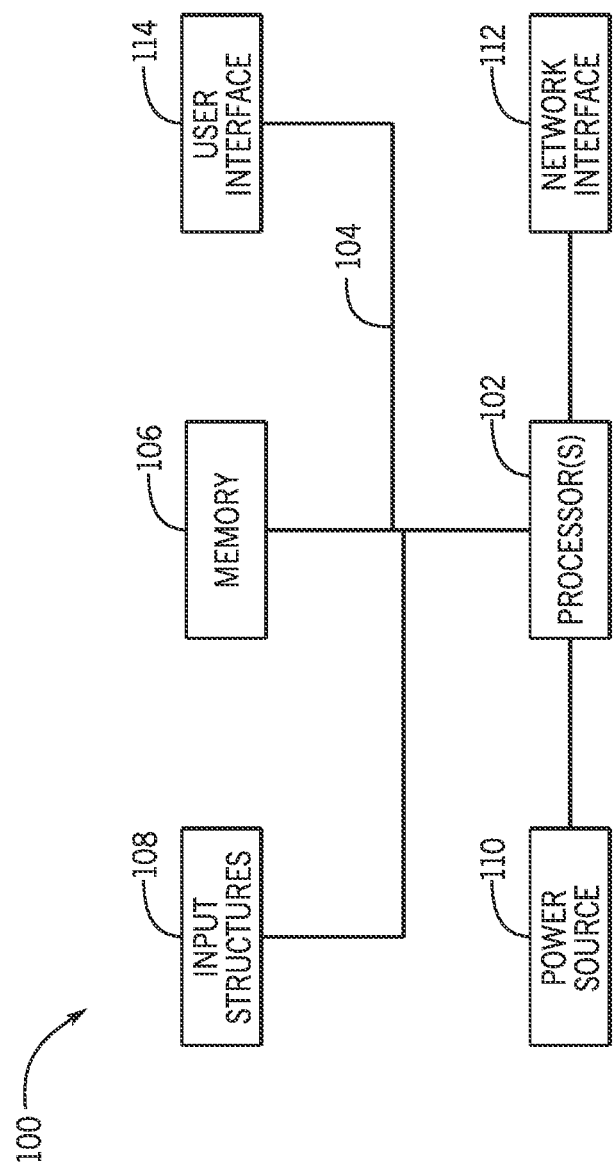
FIG. 2 illustrates a block diagram of example components that could be used in the industrial automation system of FIG. 1, in accordance with embodiments presented herein.

FIG. 2 illustrates a block diagram of example components of a computing device 100 that could be used as the computing device 26, the cloud/remote server 30, the controller 12, or some other device within the system 10 shown in FIG. 1. As used herein, a computing device 100 may be implemented as one or more computing systems including laptop, notebook, desktop, tablet, HMI, or workstation computers, as well as server type devices or portable, communication type devices, such as cellular telephones and/or other suitable computing devices.

As illustrated, the computing device 100 may include various hardware components, such as one or more processors 102, one or more busses 104, memory 106, input structures 112, a power source 114, a network interface 116, a user interface 118, and/or other computer components useful in performing the functions described herein.

The one or more processors 102 may include, in certain implementations, microprocessors configured to execute instructions stored in the memory 106 or other accessible locations. Alternatively, the one or more processors 102 may be implemented as application-specific integrated circuits (ASICs), field-programmable gate arrays (FPGAs), and/or other devices designed to perform functions discussed herein in a dedicated manner. As will be appreciated, multiple processors 102 or processing components may be used to perform functions discussed herein in a distributed or parallel manner.

The memory 106 may encompass any tangible, non-transitory medium for storing data or executable routines. Although shown for convenience as a single block in FIG. 2, the memory 106 may encompass various discrete media in the same or different physical locations. The one or more processors 102 may access data in the memory 106 via one or more busses 104.

The input structures 112 may allow a user to input data and/or commands to the device 100 and may include mice, touchpads, touchscreens, keyboards, controllers, and so forth. The power source 114 can be any suitable source for providing power to the various components of the computing device 100, including line and battery power. In the depicted example, the device 100 includes a network interface 116. Such a network interface 116 may allow communication with other devices on a network using one or more communication protocols. In the depicted example, the device 100 includes a user interface 118, such as a display that may display images or data provided by the one or more processors 102. The user interface 118 may include, for example, a monitor, a display, and so forth. As will be appreciated, in a real-world context a processor-based system, such as the computing device 100 of FIG. 2, may be employed to implement some or all of the present approach, such as performing the functions of the controller, the computing device 26, and/or the cloud/remote server 30 shown in FIG. 1, as well as other memory-containing devices.

Figure 3:
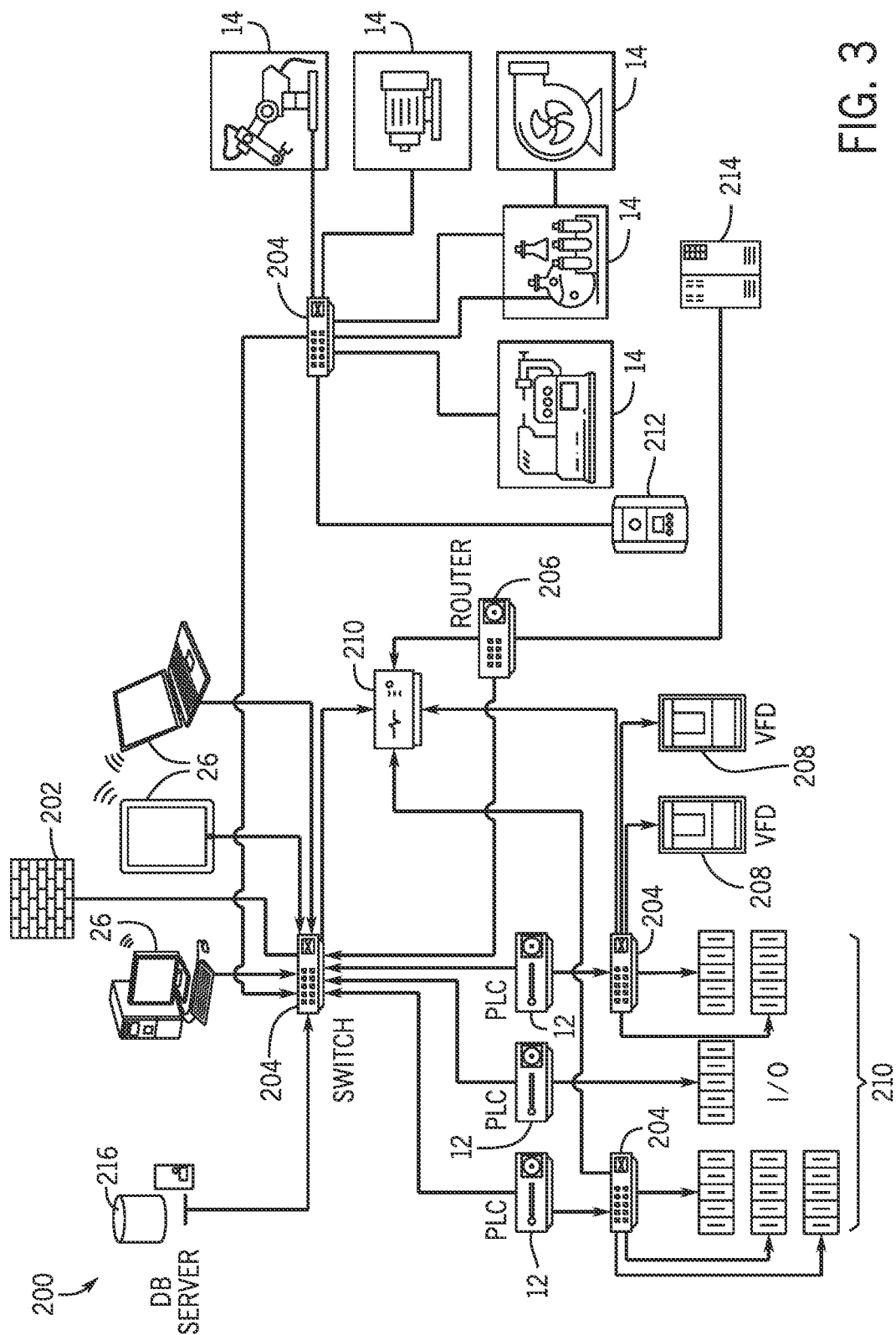
FIG. 3 illustrates a schematic of an operational technology (OT) network that may include the industrial automation system of FIG. 1, in accordance with embodiments presented herein.

With the preceding in mind, FIG. 3 illustrates an embodiment of an operational technology (OT) network 200. As shown, the OT network 200 is disposed behind a firewall 202, which monitors and controls traffic into and out of the OT network 200. The firewall 202 may be a dedicated special-purpose hardware device, software running on a generic piece of hardware, or a virtual component running on a host. The firewall 202 may be configured to inspect and filter packets being transmitted between devices on the OT network 200. In such embodiments, the firewall 202 may maintain an access control list which dictates what packets will be inspected, how the packets will be inspected, and what action should be taken as a result of the inspection. Packets may be filtered, for example, based on source IP address, destination IP address, protocol, source port, destination port, and so forth. Further, the firewall 202 may be capable of distinguishing between specific types of traffic, such as web traffic, command signals, sensor data, email transition, file transfers, notifications, and so forth.

As shown, the OT network 200 may also include one or more network switches 204 that connect devices on the OT network 200 and facilitate communication between devices on the OT network 200. A network switch 204 is a piece of networking hardware that connects devices on the network 200 by using packet switching to receive and forward network traffic to the destination device. Specifically, each network switch 204 may be a multiport network bridge that uses MAC addresses to forward data packets at the link layer or the network layer of the OT network 200 only to the intended destination device. Each device on the network 200 is identified by its network address, thus allowing the switch 204 to direct network packets to the destination device.

The OT network 200 shown in FIG. 3 also includes a router 206, which may be used to connect the OT network 200 to one or more other networks, such as an IT network, another OT network, a local area network (LAN), a wide area network (WAN), and the like. When the router 206 receives a data packet, the router 206 reads the network address information in the packet header to determine the destination and then directs the packet to another network based on a routing table or routing policy. In some embodiments, the router 206 may enable multiple devices on the OT network 200 to share an internet protocol (IP) address. The router 206 may also be used to connect two or more subnets (e.g., groups of devices on the OT network 200), each having a different network prefix. In some embodiments, the OT network 200 may utilize one or more gateways or gateway devices in addition to, or in place of, the router 206. Like the router 206, a gateway facilitates data flow between networks, however, unlike the router 206, the gateway may use more than one protocol to connect networks. In some cases, the switches 204 and/or routers 206 may be collectively referred to as edge devices. In some cases, the switches 204 and/or routers 206 may be equipped with memories and/or processors and configured to perform computing and/or storage functions on the edge device. As shown in FIG. 3, the OT network 200 may include various components that are communicatively coupled to one another via the edge devices. These components may include, for example, controllers 12, such as programmable logic controllers (PLCs), actuators 14, such as robots, motors, pumps, valves, machines, heaters, mixers, conveyors, and so forth, variable frequency drives (VFDs) 208, input/output (I/O) modules 210, power supplies 212, such as uninterruptable power supplies, various engineered systems 214, and so forth. A PLC 12 is an industrial computer that is configured to control industrial automation systems such as assembly lines, manufacturing processes, machines, robots, etc. A VFD 208 is a motor drive used to control alternating current (AC) motor speed and torque by varying the input frequency of the motor to control voltage and/or current variation. I/O modules 210 act as an interface between a controller and an actuator and/or senor. An engineered system 214 may be a turn-key industrial automation system that includes multiple components and is configured to perform a particular operation.

As shown, the OT network 200 may include a database server 216 which may store organized data for the OT network 200. Accordingly, the various devices on the OT network 200 may be able to transmit collected and/or generated data to the database server 216 and retrieve data from the database server 216 via the switches 204. The database server 216 may store, for example, data associated with assets on the OT network 200, run-time data collected during performance of industrial automation operations, analysis engines, machine learning models, enterprise policies, and so forth.

Further, the OT network 200 may include one or more human-machine-interfaces (HMIs), such as desktop computers, laptop computers, tablets, mobile phones, etc. by which a user may access, configure, monitor, and/or control the various devices on the OT network 200. Part of effectively managing an OT network 200 is knowing what is on the OT network 200. A network administrator may utilize the computing devices 26 to run a network discovery process to gain an accurate understanding of the OT network 200. However, running network discovery on an OT network 200 may be significantly more complicated that running network discovery on an IT network. First, an OT network may have a more complex architecture, with more network layers, than a corresponding IT network. For example, unlike the OT network shown in FIG. 3, an IT network may have a flatter structure, with routers 206, computing devices 26, connected by switches 204, one or more servers, such as a database server 216, a firewall 202, and may have a few printers. Second, an OT network may have a wider range of components than would be found on a similar IT network. For example, as previously described, the IT network may include routers 206, computing devices 26, switches 204, servers, such as a database server 216, a firewall 202, and a few printers, whereas an OT network may also include PLCs 12, VFDs 208, I/O devices 210, UPSs 212, robots, motors, pumps, valves, machines, heaters, mixers, conveyors, engineered systems 214, and so forth. Further, the OT network is more likely to include older legacy components with limited capabilities that would have been replaced many years prior in a corresponding IT network. Third, because security is a significant consideration in OT networks, communication within the OT network may be restricted. As a result, not all of the components on an OT network may be able to run a discovery agent and/or respond to discovery probes sent by a discovery agent running on another device. As such, running network discovery on an OT network 200 may involve gathering information about a component on the OT network 200 from one or more other components on the OT network 200 rather than from the component itself. Performing network discovery on an OT network 200 may include processing data received from multiple components on the OT network to infer information about a component with which the devices performing discovery may not have direct communication.

Figure 4:
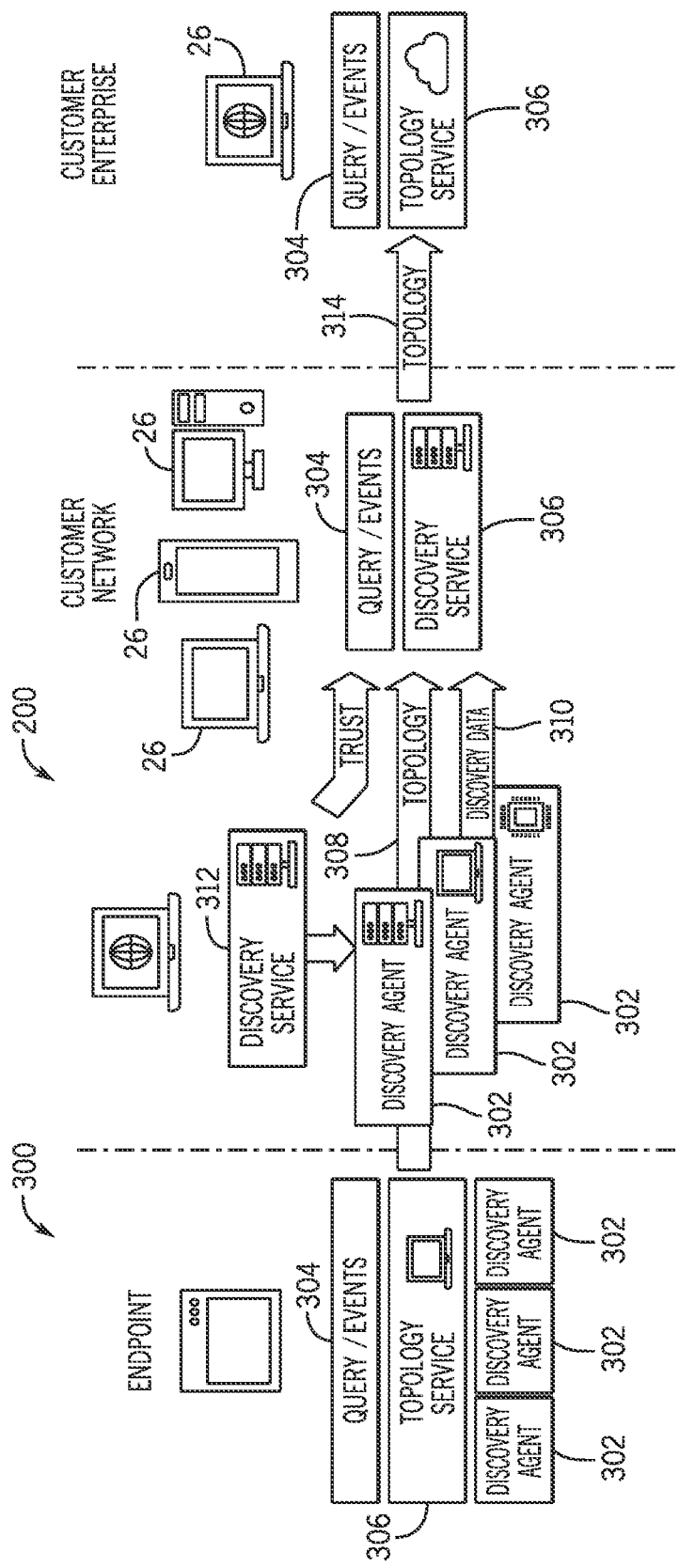
FIG. 4 is a schematic illustrating a flow of data during network discovery of the OT network of FIG. 3, in accordance with aspects of the present disclosure.

FIG. 4 is a schematic illustrating the flow of data during network discovery of an OT network 200. As shown, an endpoint 300 disposed within the OT network 200 may have one or more discovery agents 302 installed and running thereon. The endpoint 300 shown in FIG. 4 may be any hardware component on the OT network 200 that includes a memory and a processor and is capable of running a discovery agent 302. For example, the endpoint 300 shown in FIG. 4 may be a computing device (e.g., a computer, a tablet, a mobile device, an HMI, etc.), a server, a switch, a router, and so forth. Further, the endpoint 300 may be an industrial automation device, such as a PLC, robot, a motor, a pump, a valve, a machine, a heater, a mixer, a conveyor, a VFD, an I/O device, a power supply, an engineered system, and so forth. Though not shown in FIG. 4, it should be understood that the OT network 200 may include other end devices that do not have discovery agents installed thereon. This may be, for example, because such end devices lack a memory and a processor, because the end devices are otherwise incapable of running a discovery agent, because an operator is unable or unwilling to install a discovery agent on the end device, because of security concerns, and so forth. Accordingly, end devices that are not running discovery agents 302 may rely on discovery agents running on other devices to be discovered. The discovery agents 302 may be configured to transmit requests to information, called discovery probes, to other devices on the OT network 200 to which they are connected. The requested information may include, for example, manufacturer name, product name, model name/number, serial number, firmware version, software running on the endpoint, software version, port status, device health, end point name (e.g., node name), and so forth. Further, discovery agents 302 may respond to discovery probes received from other devices on the OT network 200 that may or may not have discovery agents 302 installed. Discovery agents installed throughout the OT network 200 may also be configured to collect other data that may be indicative of components on the OT network 200, such as captured network traffic, Common Industrial Protocol (CIP) discovery data, link layer discovery protocol (LLDP) data, FACTORYTALK Network Manager (FTNM) data, FACTORYTALK Linx data, network traffic data, Open Platform Communications Unified Architecture (OPC-UA) data, WINDOWS Management Instrumentation (WMI) Probe data, and/or third party data. Such data may be collected, for example, from a query/events log 304 stored on the endpoint 300.

In some embodiments, raw discovery data may transmitted from the endpoint 300. However, in other embodiments, a topology service 306 may be installed on the endpoint 300 and configured to pre-process the collected discovery data to generate a map of the topology of the OT network 200 in the vicinity of the OT network 200 around the endpoint device, otherwise referred to as topology data 308 or topology fragments. As shown in FIG. 4, the topology data 308 may be transmitted to one or more central or upstream topology service 306 installations, which may consolidate topology data 308 and discovery data 310 received via various discovery agents 302 installed throughout the network, from endpoints 300 or nodes throughout the OT network 200. The topology service 306 processes and consolidates the received discovery data 310 and topology data 308 to generate a topology of the OT network 200. In some embodiments, the topology service 306 may also consider data collected from a local or otherwise accessible query/events log 306. Processing the received discovery data 310 and topology data 308 to generate the topology 314 (e.g., map) of the OT network 200 may include, for example, using characteristic information (e.g., IP addresses, MAC addresses, serial numbers, etc.) to identify and/or characterize components that appear in multiple sets of data and then stitching those sets of data together and consolidating the data, until a topology 314 (e.g., map) of the whole OT network 200 can be generated. In some embodiments, this may include, for example, making inferences and/or assumptions about a component based on data received from one or more other components in the network (e.g., that the component is connected to a particular port, using a particular protocol, and so forth) that provides context for the data, if any, received from the component itself. Legacy devices or other components that may lack discovery capabilities may be identified by other components on the OT network 200 and/or based on noise in their communication with other components.

Though FIG. 4 shows the endpoint 300 passing topology data 308 and/or discovery data 310 directly to a central or upstream topology service 306 installation to generate a topology 314 of the whole OT network 200, it should be understood that in some embodiments, such as those with more complex OT networks 200, the endpoint 300 may pass topology data 308 and/or discovery data 310 to one or more intermediate topology service 306 installation, which when pass the topology data 308 and/or discovery data 310 to another intermediate topology service 306 installation or a central topology service 306 installation.

In embodiments in which the OT network 200 is operated by an enterprise that operates multiple OT networks 200, the central topology service installation 306 may pass the topology 314 to an enterprise installation of the topology service, which may further consolidate the topologies into a topology that spans multiple OT networks 200.

Figure 5:
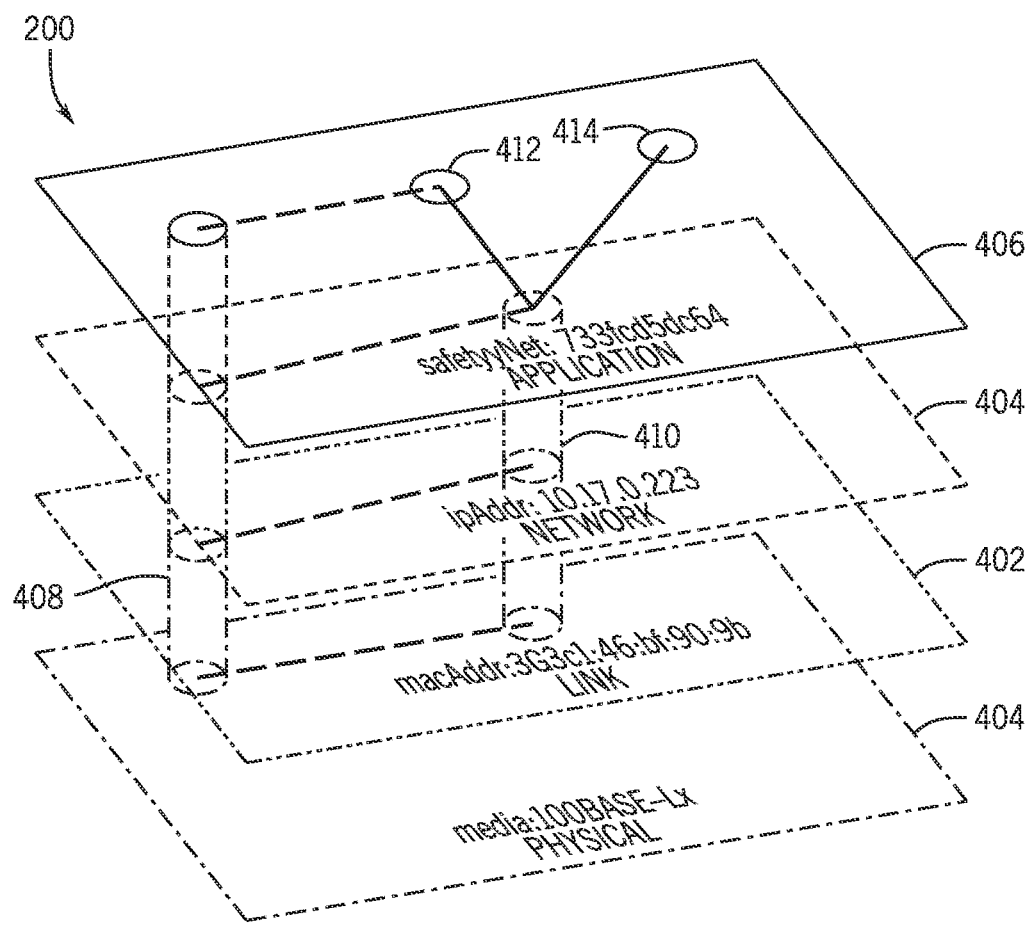
FIG. 5 is a schematic illustrating layers of an OT network 200, in accordance with aspects of the present disclosure.

FIG. 5 is a schematic illustrating layers of an OT network 200. As shown, the OT network 200 includes a physical layer 400, a link layer 402, a network layer 404, and an application layer 406. The physical layer 400 includes hardware devices and the transmission of data between them. These hardware devices may include, for example, a computing device (e.g., a computer, a tablet, a mobile device, an HMI, etc.), a server, a switch, a router, a network interface controller, an Ethernet hub, an industrial automation device, such as a PLC, robot, a motor, a pump, a valve, a machine, a heater, a mixer, a conveyor, a VFD, an I/O device, a power supply, an engineered system, and so forth. The data transmitted between devices may be raw or otherwise unstructured data that are transmitted via electrical signals, radio signals, optical signals, etc. Physical layer specifications of the OT network 200 may define, for example, voltage levels, the timing of voltage changes, data rates, maximum transmission distances, modulation schemes, characteristics of physical connectors (e.g., pin layouts, voltages, line impedance, cable specifications, signal timing and frequency, etc.). The physical layer specifications may also define bit rate control, which may define transmission modes as simplex, half duplex, or full duplex.

The physical layer of the network is where OT networks are most distinguishable from IT networks. Whereas IT networks typically include a relatively narrow spectrum of devices (e.g., desktop computers, laptop computers, tablets, mobile devices, servers, printers, routers, switches, hubs, etc.) having relatively short lifespans (e.g., typically fewer than 7-10 years) communicating with one another in a relatively narrow spectrum of protocols, OT networks can include a vast spectrum of devices (e.g., typical computing devices and network devices, as well as PLCs, VFDs, I/O modules, power supplies, IoT devices, robots, motors, pumps, valves, machines, heaters, mixers, conveyors, etc.) having relatively long lifespans (e.g., 30 years or more), communicating with one another in a wide spectrum of protocols. Further, given the ages of the devices on the physical layer and security concerns associated with the OT network, communication within the OT network may be restricted. Moreover, there are many other characteristics of OT networks that set OT networks apart from IT networks. For example, OT networks may have time-sync parameters (e.g., deterministic performance) as well as priority for high availability and network integrity, whereas a similar IT network may prioritize data pervasiveness and confidentiality. Additionally, whereas IT networks may be multi-tiered and provide wide access, OT networks may be more proprietary in nature and more task-specific. Further, whereas IT networks may be setup to achieve digital outcomes, OT networks may be set up to achieve physical outcomes. Accordingly, the physical layer of the OT network presents the greatest challenge when performing network discovery, such that it may be difficult to discover some devices on the OT network and it may be difficult to determine if all of the devices on the OT network have been discovered.

The link layer 402 facilitates node-to-node transfer of data between connected network nodes. Errors that occur in the physical layer 400 may be detected and corrected in the link layer 402. The link layer 402 defines the protocol by which connections between physically connected components are created and terminated, as well as the protocol for flow control between them. The link layer 402 may include one or more sub-layers, such as a medium access control (MAC) layer and a logical link control (LLC) layer. The MAC layer controls how devices on the network 200 gain access to a resource and obtain access to transmit data on the network 200. The LLC layer encapsulates network layer protocols, controls error checking, and controls frame synchronization.

The network layer 404 transfers packets between nodes in different networks. Each node on the network 200 can be identified by an address. Accordingly, a node can transfer a message to another node by providing the content of the message and an address of the destination node. The network layer 404 then directs the message to the destination node. In some cases, the message may work its way through one or more intermediate nodes. If the message is too large to be transmitted from one node to another, the network layer 404 may split the message into several fragments at one node, send the message fragments separately, and then reassemble the fragments at another node.

The application layer 406 includes applications running on devices that are on the OT network 200. The application layer 406 interacts directly with software applications that implement communication between a client device and a server. When an application has data to transmit, the application layer 406 may determine the identity and availability of communication partners. Further, the application layer 406 may facilitate file sharing, message handling, database access, and so forth. Application layer 406 protocols may include, for example, HTTP, FTP, SMB/CIFS, TFTP, and SMTP.

As shown in FIG. 5, some components may appear as nodes in multiple layers of the OT network 200. For example, a first component 408 appears as nodes in the physical layer 400, the link layer 402, the network layer 404, and the application layer 406. Such a component may be a piece of hardware with network communication capabilities that runs an associated application or software for configuring and/or operating the component. Similarly, component 410 appears as nodes in the physical layer 400, the link layer 402, and the network layer 404. Such a component may be a piece of hardware with network communication capabilities, but that is does not run an application that appears in the application layer 406. As shown, the application layer includes nodes 412 and 414 that do not also appear as nodes in the other layers of the OT network 200. However, node 414 is linked to component 410, indicating that node 414 may represent an application that communicates with component 410. For example, node 414 may correspond to an application that configures and monitors the operation of component 410. Similarly, node 412 is linked to both component 408 and component 410, indicating that node 412 may represent an application that communicates with components 408 and 410. For example, node 412 may correspond to an application that collects data from components 408 and 410. Identifying nodes associated with components that appear in multiple layers of the OT network 200 may be used to associate nodes across multiple layers of the OT network 200 during network discovery such that separate discovery processes do not need to be run on each layer of the OT network 200. Accordingly, FIGS. 6-9 illustrate how multi-layer network discovery may be performed on an OT network 200.

FIG. 6 is a schematic depicting a first iteration of network discovery using a first node 500 as a first entry point. Discovery probes are sent out to connected nodes via a discovery agent. The discovery probes request discovery data (e.g., a manufacturer name, a product name, a model name, a model number, a serial number, a firmware version, a software version, a port status, captured network traffic, CIP discovery data, LLDP data, FTNM data, FACTO- RYTALK Linx data, network traffic data, OPC-UA data, WMI Probe data, and so forth) from the connected nodes. In the OT network 200 shown in FIG. 6, the first node 500 is connected to second and third nodes 502, 504 on the application layer 406 of the OT network 200. The second node 502 is part of a first component 506 that also appears as a fourth node 508 in the physical layer 400 of the OT network 200. Accordingly, the second node 502 responds to the discovery probes with discovery data that represent the second node 502, the fourth node 508, and the first component 506. Similarly, the third node 504 is part of a second component 510 that also appears as a fifth node 512 on the network layer 404, a sixth node 514 on the link layer 402, and a seventh node 516 on the physical layer 400. Accordingly, the third node 504 responds to the discovery probes with discovery data that represent the third node 504, the fifth node 512, the sixth node 514, the seventh node 516, and the second component 510. Additionally, because the first node 500 is part of a third component 518 that also appears as an eighth node 520 in the network layer 404, discovery data that captures the third component 518 and the eighth node 520 may already be known at the time discovery is run, or returned in response to a discovery probe. The discovery data associated with the first, second, and third components 506, 510, 518 shown in FIG. 6 may be considered a first discovery data set. As described above with respect to FIG. 4, the discovery data may be processed or pre-processed by a topology service running on the third component 518 and then transmitted to another device, or the raw discovery data may be transmitted to another device for processing.

FIG. 7 is a schematic depicting a second iteration of network discovery using a ninth node 522 as a second entry point. Discovery probes requesting discovery data (e.g., a manufacturer name, a product name, a model name, a model number, a serial number, a firmware version, a software version, a port status, captured network traffic, CIP discovery data, LLDP data, FTNM data, FACTORYTALK Linx data, network traffic data, OPC-UA data, WMI Probe data, and so forth) from connected nodes are sent out via a discovery agent. In the OT network 200 shown in FIG. 7, the ninth node 522 is connected to the fourth and seventh nodes 508, 516 on the physical layer 400 of the OT network 200. The fourth node 508 is part of the first component 506 that also appears as the second node 502 in the application layer 406 of the OT network 200. As such, the fourth node 508 responds to the discovery probes with discovery data that represent the fourth node 508, the second node 502, and the first component 506. Similarly, the seventh node 516 is part of the second component 510 that also appears as sixth node 514 on the link layer 402, the fifth node 512 on the network layer 404, and the third node 504 on the application layer 406. Accordingly, the seventh node 516 responds to the discovery probes with discovery data that represent the third node 504, the fifth node 512, the sixth node 514, the seventh node 516, and the second component 510. Because the ninth node 522 is part of a fourth component 524 that also appears as a tenth node 526 on the link layer 402 of the OT network and an eleventh node 528 on the network layer 404, discovery data that captures the fourth component 524, the tenth node 526, and the eleventh node 528 may already be known at the time discovery is run, or returned in response to a discovery probe. The discovery data associated with the first, second, and fourth components 506, 510, 524 shown in FIG. 7 may be considered a second discovery data set. The second discovery data set may be processed or pre-processed by a topology service running on the fourth component 524 and then transmitted to another device, or the raw discovery data may be transmitted to another device for processing.

FIG. 8 is a schematic depicting a third iteration of network discovery using a twelfth node 530 as a third entry point. Discovery probes requesting discovery data (e.g., a manufacturer name, a product name, a model name, a model number, a serial number, a firmware version, a software version, a port status, captured network traffic, CIP discovery data, LLDP data, FTNM data, FACTORYTALK Linx data, network traffic data, OPC-UA data, WMI Probe data, and so forth) from connected nodes are sent out via a discovery agent. In the OT network 200 shown in FIG. 8, the twelfth node 530 is connected to the fifth and eleventh nodes 512, 528 on the network layer 404 of the OT network 200. The fifth node 512 is part of the second component 510 that also appears as the third node 504 on the application layer 406, the sixth node 514 on the link layer 402, and the seventh node 516 on the physical layer 400. Accordingly, the fifth node 512 responds to the discovery probes with discovery data that represent the third node 504, the fifth node 512, the sixth node 514, the seventh node 516, and the second component 510. The eleventh node 528 is part of the fourth component 524 that also appears as the ninth node 522 on the physical layer 400, and the tenth node 526 on the link layer 402. Accordingly, the eleventh node 528 responds to the discovery probes with discovery data that represent the ninth node 522, the tenth node 526, and the fourth component 524. The twelfth node 530 is also connected to thirteenth and fourteenth nodes 532, 534 in the application layer 406 of the OT network 200, so the thirteenth and fourteenth nodes 532, 534 may respond to discovery probes with discovery data that represents the thirteenth and fourteenth nodes 532, 534, respectively. Because the twelfth node 530 is part of a fifth component 536 that also appears as a fifteenth node 538 on the application layer 406, a sixteenth node 540 on the link layer 402, and a seventeenth node 542 on the physical layer 400, discovery data that captures the fifth component 536, the twelfth node 530, the fifteenth node 538, the sixteenth node 540, and the seventeenth node 542 may already be known at the time discovery is run, or returned in response to a discovery probe. The discovery data associated with the second, fourth, and fifth components 510, 524, 536 shown in FIG. 8 may be considered a third discovery data set. The third discovery data set may be processed or pre-processed by a topology service running on the fifth component 536 and then transmitted to another device, or the raw discovery data may be transmitted to another device for processing.

Once the three sets of discovery data have been obtained, the three data sets may be processed by "stitching" the data sets together to create a holistic map of the OT network 200. FIG. 9 illustrates an example of a map 600 or other visualization of the OT network 200 based on stitching together the first, second, and third sets of discovery data described with regard to FIGS. 6-8. As shown, the map 600 includes the first, second, third, fourth, and fifth components 506, 510, 518, 524, 536 that appear in the first, second, and third sets of discovery data shown and described with regard to FIGS. 6-8. Further, the first component 506 includes second node 502 and the fourth node 508. The second component 510 includes the third node 504, the fifth node 512, the sixth node 514, and the seventh node 516. The third component 518 includes the first node 500 and the eighth node 520. The fourth component 524 includes the ninth node 522, the tenth node 526, and the eleventh node 528. The fifth component 536 includes the twelfth node 530, the fifteenth node 538, the sixteenth node 540, and the seventeenth node 542. Further, the map 600 includes the various connections between the components and nodes shown in FIGS. 6-8. In some embodiments, stitching data sets together may involve making inferences and/or assumptions about a component based on discovery data received from one or more other components in the network (e.g., that the component is connected to a particular port, using a particular protocol, and so forth) with which the component interacts. Accordingly, the data received from the other components in the network may provide context for the data, if any, received from the component itself.

The processing of the sets of discovery data may include, for example, identifying nodes and/or components that appear in multiple sets of discovery data and then using the overlap in the data sets to determine how the components and/or nodes that appear in the three data sets relate to one another and/or interact with one another. As described with regard to FIG. 4, the processing of discovery data may occur at multiple locations within an OT network 200 including, for example, at an endpoint, an intermediate location within the OT network 200 (e.g., an edge device), at a centralized location within the OT network 200, at the enterprise level, and so forth.

FIG. 10 is a flow chart of a process 700 for performing discovery of a multi-layer OT network. At block 702, discovery probes are sent out within an OT network. The discovery probes may be sent out from one or more entry points within the OT network. In some embodiments, the discovery probes may be sent out and responses received via one or more discovery agents running on components within the OT network. The discovery requests may include generic requests for information or requests for specific information.

At block 704, discovery data is received. For example, first, second, and third sets of discovery data 706, 708, 710 may be received from one or more devices on an OT network. Each set of discovery data 706, 708, 710 may correspond to one or more responses received in response to a discovery probe, responses to discovery probes received from a particular entry point or node, responses received from a portion of an OT network, and so forth. Accordingly, the first, second, and third sets of discovery data 706, 708, 710 may include overlapping data associated with various nodes and/or components within an OT network. The discovery data sets 706, 708, 710 may include, for example, manufacturer name, product name, model name/number, serial number, firmware version, software running on the endpoint, software version, port status, a unique identifier or other identifying information, as well as networking attributes, such as how different devices on the network may be connected to one another, and so forth. Though FIG. 10 shows three sets of discovery data, it should be understood that this is merely an example and that any number of discovery data sets may be received.

At block 712, nodes/components appearing in multiple sets of discovery data 706, 708, 710 are identified. This may include, for example, identifying nodes/components in each of the sets of discovery data 706, 708, 710 and then comparing the nodes/components in a particular set of discovery data 706 to the nodes/components in the other sets of discovery data 708, 710. This may be done by comparing identifying information for particular nodes/components represented by the discovery data and determining that a single node/component appears in more than one set of discovery data 706, 708, 710 when all of the identifying information is shared between more than one set of discovery data 706, 708, 710, when at least a threshold amount of data is shared between more than one set of discovery data 706, 708, 710, or when no new inter-node linkages have been identified, and so forth.

In some embodiments, network discovery may be recursive in that discovery data sets received from an entry point may include information about nodes and/or components communicatively coupled to the entry point. The one or more of the nodes and/or components communicatively coupled to the entry point may then serve as entry points for subsequent rounds of discovery probes. Accordingly, multiple iterations of discovery probes and responses may be performed before the received discovery data sets capture the entire OT network. In such embodiments, the process 700 may consider whether a sufficient number of nodes/components appear in multiple sets of discovery data 706, 708, 710 to assume that all of the nodes/components of the OT network appear in at least one set of discovery data 706, 708, 710. Such a determination may be made, for example, based on a threshold number of nodes/components appearing in multiple sets of discovery data, a threshold percentage of nodes/components appearing in multiple sets of discovery data, a threshold ratio of nodes/components appearing in multiple sets of discover data, and so forth. If the threshold has not been met, more probes may be sent out until the threshold has been met. In other embodiments, determinations about whether or not to run additional discovery may be based on whether new inter-node linkages have been identified that warrant additional discovery, whether a time interval has elapsed, and so forth.

At block 714, the discovery data sets 706, 708, 710, are stitched together based on the overlapping nodes/components that appear in multiple discovery data sets 706, 708, 710 to generate a holistic discovery data set. Each discovery data set 706, 708, 710 may be considered a "view" of the various components on the OT network and the connections between them from the perspective of one or more entry points. The nodes/components that appear in multiple views may provide context for the perspective of each view relative to the other views. By stitching the various views together based on nodes/components that appear in multiple views, a holistic discovery data set 716 may be generated that represents the entire OT network. In some embodiments, stitching data sets together may involve making inferences and/or assumptions about a component based on discovery data received from one or more other components in the network (e.g., that the component is connected to a particular port, using a particular protocol, and so forth) with which the component interacts. Accordingly, the data received from the other components in the network may provide context for the data, if any, received from the component itself. At block 718, an OT network map, or other visualization 720 may be generated based on the holistic discovery data set 716 to provide a visualization of the entire OT network.

In addition to generating a visualization of the OT network, the obtained discovery data may be used to perform a number of other functions within the OT network. For example, in one embodiment, discovery data may be used to verify the identities of counterfeit or compromised assets on the OT network and generate notifications. In such an embodiment, identifying data (e.g., unique identifiers or other identifying attributes) received from nodes/components in response to discovery probes may be transmitted to a central authority for analysis or analyzed on premises (e.g., by applying a rules engine) to determine whether the received data is reasonable or suspicious. In some embodiments this many include, for example, referencing a central database or other data source to determine is received data is reasonable or suspicious. Suspicious data may be indicative of a counterfeit device, indicative of a device being compromised, or some other issue with the device. In some cases, a notification may be generated and transmitted to a user, a network administrator, a manufacturer/distributor of the component in question, or some combination thereof.

Similarly, the discovery data may include information about the software/firmware version running on a node/component and used to identify that an asset is running an outdated version of firmware or software. In some cases, a notification that a new software/firmware version is available and recommending an update may be generated and transmitted. Along these lines, data received from nodes/components in response to discovery probes may be transmitted to a central authority for analysis or analyzed on premises (e.g., by applying a rules engine) to identify when an asset is subject to a known security vulnerability, subject to a recall, or otherwise in need of attention. A notification to that effect may be generated and transmitted. In some cases, if an asset fails or experiences a problem, the discovery data and/or other forensic data may be provided to an entity (e.g., network admin, IT department, security team, manufacturer, OEM, distributor, etc.) for analysis to determine what caused the problem.

The present disclosure includes techniques for asset discovery and management for an OT network having multiple layers. The present asset discovery and management techniques use discovery agents installed throughout the OT network to probe the OT network and identify hardware and software assets that are connected to, or otherwise visible from, the assets on which the discovery agent is running. Accordingly, the various discovery agents may return data indicative of their respective views of the OT network, each including multiple nodes (e.g., edge devices, end devices, controllers, computing devices, applications, etc.) that may span multiple layers of the OT network. The data from the various discovery agents may be combined with other discovery data (e.g., captured network traffic, CIP discovery, LLDP, FTNM, FTLinx, network traffic data, OPC-UA, WMI Probe data, and/or third party data). A topology service may receive the data from the various discovery agents, which constitute various perspective views of the OT network, as well as any other discovery data, and stitch the various views together to create a single holistic graph of the OT network. This may include, for example, using characteristic information (e.g., IP addresses, MAC addresses, serial numbers, etc.) to identify and/or characterize assets that appear in multiple sets of data and then stitching those sets of data together and consolidating the data, until a graph of the whole OT network is generated. Legacy devices that may lack discovery capabilities may be identified by other assets on the network and/or based on noise in their communication. In some cases, devices may be filtered, sorted, and or/or grouped based upon their respective functionalities. Once the topology service has developed a model of the OT network, a graphical user interface (GUI) may be presented to the customer which may include, for example, an visualization of the OT network that may or may not be interactive (e.g., zoom in, zoom out, filter assets, select assets, etc.). Further, the GUI may include a list of assets that may be sorted, filtered, searched, etc. as the user desires. In some cases, once collected, the discovery data may be used to perform various other functions. For example, discovery data may be used to verify the identities of counterfeit or compromised assets on the OT network and generate notifications. Similarly, the discovery data may be used to identify that an asset is running an outdated version of firmware or software and generate a notification that a new software/firmware version is available and recommend an update. Along these lines, discovery data may be used to identify when an asset is subject to a known security vulnerability, subject to a recall, or otherwise in need of attention and generate a notification to that effect. In some cases, if an asset fails or experiences a problem, the discovery data and/or other forensic data may be provided to an entity (e.g., network admin, IT department, security team, manufacturer, OEM, distributor, etc.) for analysis. Use of the disclosed techniques enables operators of OT networks to better understand and manage the assets running on their OT network.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:
1. A system, comprising:
a processor; and
a memory, accessible by the processor, and storing instructions that, when executed by the processor, cause the processor to perform operations comprising:
transmitting a plurality of discovery probes from a plurality of respective entry points into an operational technology (OT) network, wherein the OT network comprises a plurality of industrial automation components configured to perform an industrial automation operation, and wherein the OT network comprises a plurality of network layers;
receiving a plurality of discovery data sets in response to the plurality of discovery probes, wherein each of the plurality of discovery data sets comprises data identifying a respective subset of a plurality of nodes within the OT network, wherein the respective subset of the plurality of nodes for a first discovery data set are disposed within at least two network layers of the plurality of network layers;
identifying a set of nodes within the OT network that appear in two or more of the plurality of discovery data sets;
generating a holistic discovery data set for the OT network based on the plurality of discovery data sets and the identified set of nodes within the OT network that appear in the two or more of the plurality of discovery data sets; and
generating a visualization of the plurality of nodes within the OT network based on the holistic discovery data set.

2. The system of claim 1, wherein the plurality of network layers comprise one or more physical layers, one or more link layers, one or more network layers, one or more application layers, or any combination thereof.

3. The system of claim 1, wherein the operations comprise:
in response to determining that the set of nodes within the OT network that appear in the two or more of the plurality of discovery data sets does not meet a specified condition, transmitting an additional plurality of discovery probes from an additional plurality of respective entry points into the OT network;
receiving an additional plurality of discovery data sets in response to the additional plurality of discovery probes, wherein each of the additional plurality of discovery data sets comprises data identifying an additional respective subset of the plurality of nodes within the OT network; and
identifying an additional set of nodes within the OT network that appear in two or more of the plurality of discovery data sets and the additional plurality of discovery data sets;
wherein generating the holistic discovery data set for the OT network is in response to determining that the set of nodes and the additional set of nodes meet the specified condition, and wherein the holistic discovery data set for the OT network is generated based on the plurality of discovery data sets, the additional plurality of discovery data sets, and the identified additional set of nodes within the OT network that appear in the two or more of the plurality of discovery data sets and the additional plurality of discovery data sets.

4. The system of claim 3, wherein the specified condition comprises a threshold number of nodes in (1) the set of nodes, or (2) the set of nodes and the additional set of nodes.

5. The system of claim 1, wherein the data identifying the respective subset of the plurality of nodes within the OT network comprise a manufacturer name, a product name, a model name, a model number, a serial number, a firmware version, a software version, a port status, or any combination thereof.

6. The system of claim 1, wherein the system comprises an edge device.

7. The system of claim 1, wherein the operations comprise transmitting the holistic discovery data set, the visualization, or both, to another node of the plurality of nodes within the OT network.

8. The system of claim 1, wherein the operations comprise transmitting the holistic discovery data set, the visualization, or both, to an enterprise device disposed outside of the OT network.

9. A method, comprising:
receiving a plurality of discovery data sets, wherein each of the plurality of discovery data sets comprises data identifying a respective subset of a plurality of nodes within an operational technology (OT) network, wherein the OT network comprises a plurality of network layers, wherein the respective subset of the plurality of nodes for a first discovery data set are disposed within at least two network layers of the plurality of network layers;
identifying a set of nodes within the OT network that appear in two or more of the plurality of discovery data sets;
generating a holistic discovery data set for the OT network based on the plurality of discovery data sets and the identified set of nodes within the OT network that appear in the two or more of the plurality of discovery data sets; and
generating a visualization of the plurality of nodes within the OT network based on the holistic discovery data set.

10. The method of claim 9, wherein one or more of the plurality of discovery data sets are received from one or more edge devices.

11. The method of claim 9, wherein one or more of the plurality of discovery data sets are received from one or more end devices.

12. The method of claim 9, wherein the plurality of network layers comprise one or more physical layers, one or more link layers, one or more network layers, one or more application layers, or any combination thereof.

13. The method of claim 9, comprising:
analyzing the holistic discovery data set to identify a particular industrial automation device disposed within the OT network as counterfeit; and
generating a notification indicating that the identified particular industrial automation device is counterfeit.

14. The method of claim 9, comprising:
analyzing the holistic discovery data set to identify a particular industrial automation device disposed within the OT network as running an outdated version of firmware; and
generating a notification indicating that the identified particular industrial automation device is running the outdated version of the firmware.

15. A non-transitory computer readable medium storing instructions that, when executed by a processor, cause the processor to perform operations comprising:
transmitting a first plurality of discovery probes from a first plurality of respective entry points into an operational technology (OT) network, wherein the OT network comprises a plurality of industrial automation components configured to perform an industrial automation operation, and wherein the OT network comprises a plurality of network layers;
receiving a first plurality of discovery data sets in response to the first plurality of discovery probes, wherein each of the first plurality of discovery data sets comprises data identifying a first respective subset of a plurality of nodes within the OT network, wherein the first respective subset of the plurality of nodes for a first discovery data set are disposed within at least two network layers of the plurality of network layers;
identifying a first set of nodes within the OT network that appear in two or more of the first plurality of discovery data sets;
in response to determining that the first set of nodes does not meet a specified condition, transmitting a second plurality of discovery probes from a second plurality of respective entry points into the OT network;
receiving a second plurality of discovery data sets in response to the second plurality of discovery probes, wherein each of the second plurality of discovery data sets comprises data identifying a second respective subset of the plurality of nodes within the OT network;
identifying a second set of nodes within the OT network that appear in two or more of the first and second plurality of discovery data sets; and
in response to determining that the first set of nodes and the second set of nodes meet the specified condition, generating a holistic discovery data set for the OT network based on the first plurality of discovery data sets, the second plurality of discovery data sets, and the identified second set of nodes within the OT network that appear in the two or more of the first and second plurality of discovery data sets.

16. The non-transitory computer readable medium of claim 15, wherein the operations comprise transmitting the holistic discovery data set to another node of the plurality of nodes within the OT network.

17. The non-transitory computer readable medium of claim 15, wherein the operations comprise transmitting the holistic discovery data set to an enterprise device disposed outside of the OT network.

18. The non-transitory computer readable medium of claim 15, wherein the operations comprise generating a visualization of the plurality of nodes within the OT network based on the holistic discovery data set.

19. The non-transitory computer readable medium of claim 15, wherein the plurality of industrial automation components comprise a programmable logic controller (PLC), an actuator, a robot, a motor, a pump, a valve, a machine, a heater, a mixer, a conveyor, a variable frequency drive (VFD), an input/output (I/O) device, a power supply, an engineered system, or other industrial automation device, or any combination thereof.

20. The non-transitory computer readable medium of claim 15, wherein the data identifying the respective subset of the plurality of nodes within the OT network comprise a manufacturer name, a product name, a model name, a model number, a serial number, a firmware version, a software version, a port status, captured network traffic, link layer discovery protocol (LLDP) data, Open Platform Communications Unified Architecture (OPC-UA) data, or any combination thereof.

* * * * *